United States Patent [19]
Rosaen

[11] 4,041,891
[45] Aug. 16, 1977

[54] FLOW INDICATOR WITH IMPROVED BIASING ASSEMBLY

[75] Inventor: Nils O. Rosaen, Bloomfield Hills, Mich.

[73] Assignee: Nancy Helen Rosaen, Ann Arbor, Mich. ; a part interest

[21] Appl. No.: 669,260

[22] Filed: Mar. 22, 1976

[51] Int. Cl.² .............................................. G01F 1/28
[52] U.S. Cl. ................................... 116/117 R; 73/228
[58] Field of Search ..................... 73/228, 186, 194 R; 116/117 R, 129 R, 114 R, 124 A, 112; 340/239 R, 239 F

[56] References Cited
U.S. PATENT DOCUMENTS

| | | | |
|---|---|---|---|
| 2,917,922 | 12/1959 | Morse | 73/228 |
| 3,282,102 | 11/1966 | Rosaen | 73/228 |
| 3,685,354 | 8/1972 | Rosaen | 73/228 |

Primary Examiner—S. Clement Swisher
Assistant Examiner—Denis E. Corr
Attorney, Agent, or Firm—Gifford, Chandler, Sheridan & Sprinkle

[57] ABSTRACT

A flow indicator for use in conjunction with a flow meter of the type which imparts a rotational movement to a shaft in response to the fluid flow rate through the flow meter. A biasing assembly for biasing the shaft in a rotational direction opposite to that produced by the fluid flow through the flow meter is provided comprising a spring carrier, a screw for securing the spring carrier to the shaft, and a coil spring secured at one end to the spring carrier and at its other end to a spring retainer shell which is secured against rotation to the flow meter. Removable pins extend through the spring carrier and the spring retainer shell to prevent rotation of the retainer shell relative to the spring carrier until the biasing assembly is secured to the flow meter indicator. An indicator needle is attached to an outwardly extending end of the spring carrier and provides a visual indication of the rotational position of the spring carrier exteriorly of the flow indicator.

5 Claims, 5 Drawing Figures

FLOW INDICATOR WITH IMPROVED BIASING ASSEMBLY

BACKGROUND OF THE INVENTION

I. Field of the Invention

The present invention relates to fluid systems, and more particularly, to a fluid device for indicating the rate of fluid flow through such systems, and new and improved means for biasing the indicator means towards a zero-flow position.

II. Description of the Prior Art

Positive displacement flow meters, such as described in my previous U.S. Pat. No. 3,282,102, issued on Nov. 1, 1966, have means for imparting a rotation to a shaft dependent upon the fluid flow rate through the flow meter. A pointer arm is secured to one end of the shaft externally of the flow meter and the pointer arm provides a visual indication of the rotation of the shaft and, hence, the rate of flow through the flow meter.

The fluid flow responsive means, such as the vane in my aforementioned patent, is operatively connected with the shaft which is biased toward a zero-flow position. To achieve this end, previously known flow meters have utilized a torsion spring to bias the shaft, and hence the fluid flow measuring means connected therewith, towards a zero-flow position. The previously known torsion spring biasing means, however, suffers several disadvantages of which it is the object of the present application to overcome.

One drawback of the previously known torsion springs for flow meters, is that the torsion spring is usually secured directly to the flow indicator housing. Since for durability the flow meter housings are constructed of metal, the metal to metal contact between the spring and the flow meter housing results in corrosion of the spring and subsequent spring failure.

Another disadvantage with the previously known flow meter torsion springs, is that pre-assembly of the torsion spring assembly is not feasible. Consequently when it becomes necessary to replace the torsion spring in an already installed flow meter, it is necessary to wind the torsion spring at the field location. Such a procedure is not only time consuming, but, in addition, due to unavoidable errors in manual installations, the tension on the torsion spring varies from one flow meter to another. Needless to say, differing spring tensions between otherwise identical flow meters result in inaccurate flow rate indications.

SUMMARY OF THE PRESENT INVENTION

The present invention obviates the above-mentioned disadvantage of the previously known torsion springs by providing a torsion spring assembly adapted for use with a flow meter of the type which imparts a rotation to a shaft in response to the variation of the flow rate through the flow meter. The torsion spring assembly comprises a spring carrier having a coil torsion spring secured at one end to the spring carrier and at its other end to a spring retainer shell so that the coil spring is sandwiched between the spring carrier and the retainer shell. Preferably both the spring carrier and the retainer shell are constructed of a plastic material to avoid a metal to metal contact with the spring and the previously mentioned resultant corrosion of the spring.

The tension of the coil spring is pre-set and at least one removable pin member is provided through registering apertures in the spring carrier and the retainer shell to prevent rotation of the retainer shell, and hence unwinding of the spring, relative to the spring carrier.

The torsion spring assembly includes a central bore adapted to receive the shaft from the flow meter therein and a locking screw is provided on the spring carrier to secure the spring carrier against rotation relative to the shaft. Upon installation a pin carried by the flow meter housing is received in a bore provided in the spring retainer shell to prevent rotation of the retainer shell relative to the flow meter housing. After the spring carrier is secured to the shaft, the locking pin or pins are removed so that the spring carrier may rotate relative to the retainer shell and an indicator needle is secured to an outwardly extending end of the spring carrier to provide a visual indication of the rotational position of the spring carrier and hence the flow meter shaft, exteriorly of the indicator housing.

In the preferred form of the invention, a cam member is secured to the spring carrier, said cam member having a cam surface adapted to actuate a switch in the indicator housing when the rotational position of the spring carrier reaches a predetermined position. The switch may be used for a variety of purposes, such as sounding an alarm or actuating a filter cleaning mechanism.

BRIEF DESCRIPTION OF THE DRAWINGS

The present invention will be more clearly understood by reference to the following detailed description when read in conjunction with the accompanying drawing wherein like reference characters refer to like parts throughout the several views, and in which.

DETAILED DESCRIPTION OF THE PRESENT INVENTION

Figure 1:
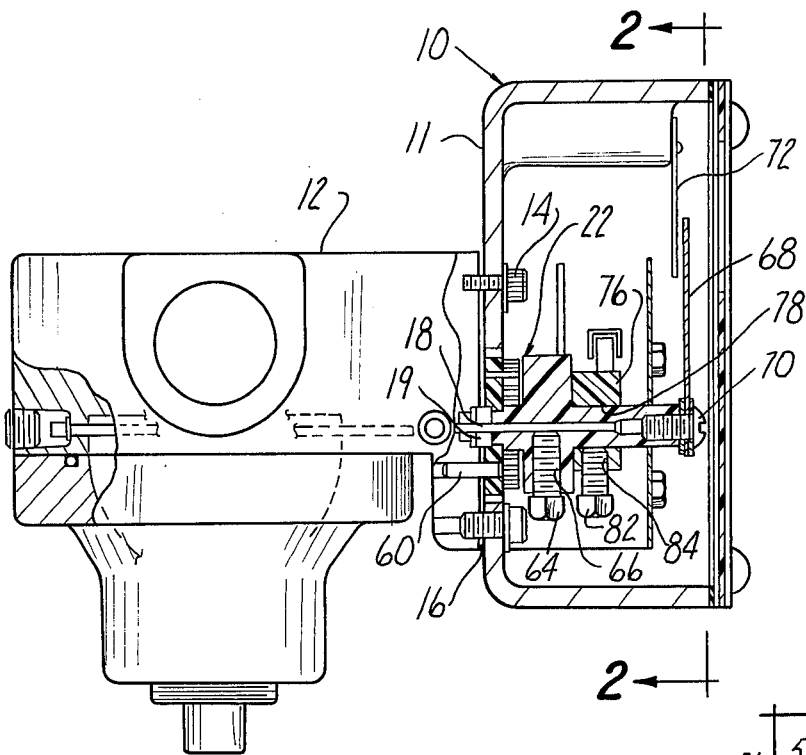
FIG. 1 is a fragmentary side cross-sectional view showing the flow indicator of the present invention.

Referring first primarily to FIG. 1, a flow indicator 10 is contained within a housing 11 which is mounted externally of and adjacent to a flow meter 12 by bolts 14. A gasket 16 provides a sealing engagement between the flow indicator housing 11 and the flow meter 12 to keep dirt, moisture, and the like outside the housing 11. The flow meter 12 is preferably of the positive displacement type disclosed in my aforementioned patent wherein the flow meter 12 rotatably positions a shaft 18 in response to the rate of fluid flow through the flow meter 12. Appropriate sealing means 19 are included intermediate the shaft 18 and the flow meter 12 to prevent fluid communication along the surface of the shaft 18 between the flow indicator 10 and the fluid chambers of the flow meter 12.

As set forth in my aforementioned patent, it is necessary to bias the flow meter shaft 18 toward a zero-flow condition. To this end an improved torsion spring assembly 22 is provided which forms the novelty of the present invention. As can best be seen in FIGS. 2–4, the spring assembly 22 of the present invention essentially comprises a spring carrier 24, a spring retainer shell 26 and a coil spring 28 sandwiched between the retainer shell 26 and the spring carrier 24. The spring carrier 24 is preferably constructed of plastic, generally cylindrical in shape, and includes a central axial bore 30 formed therethrough and adapted to receive the flow meter shaft 18 therein. An enlarged diameter portion 32 of the spring carrier 24 is formed near one end of the carrier 24 thus dividing the spring carrier 24 into a short reduced diameter portion 34 and an elongated reduced diameter portion 36. A still further reduced diameter portion 38 is formed coaxially with the short reduced diameter portion 34, for a purpose to be shortly hereinafter described.

Figure 5:
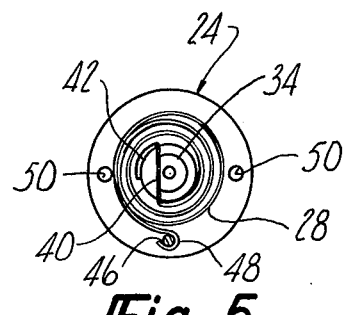
FIG. 5 is a view taken substantially along line 5—5 of FIG. 3.

As best shown in FIG. 5, the reduced diameter portion 34 of the spring carrier 24 includes a slot 40 which receives and secures one end 42 of the coil spring 28 to the spring carrier 24. However, other means, such as a screw, may be utilized to secure the end 42 of the coil spring 28 to the spring carrier reduced diameter portion 34.

Referring again to FIGS. 3 and 4, the spring retainer shell 26 is also preferably constructed of plastic and includes a central axial bore 44 which is dimensioned to receive the spring carrier reduced diameter portion 38 therein. A pin member 46, which may be integral with the retainer shell 26, is provided near the periphery of the retainer shell 26. A hooked end 48 of the coil spring 28 is adapted to hook around the pin member 46 to secure the hooked end 48 of the coil spring 28 to the spring retainer shell 26.

Figure 3:
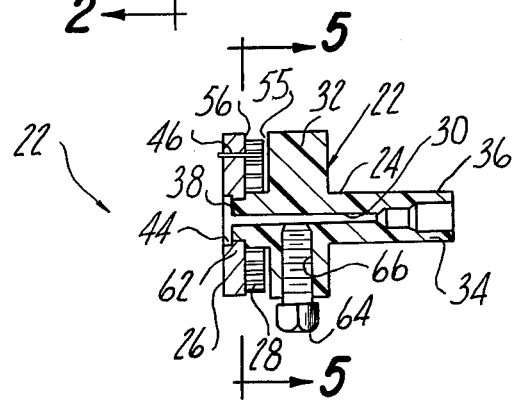
FIG. 3 is a transverse, cross-sectional view of the improved biasing means of the present invention enlarged for clarity.
Figure 4:
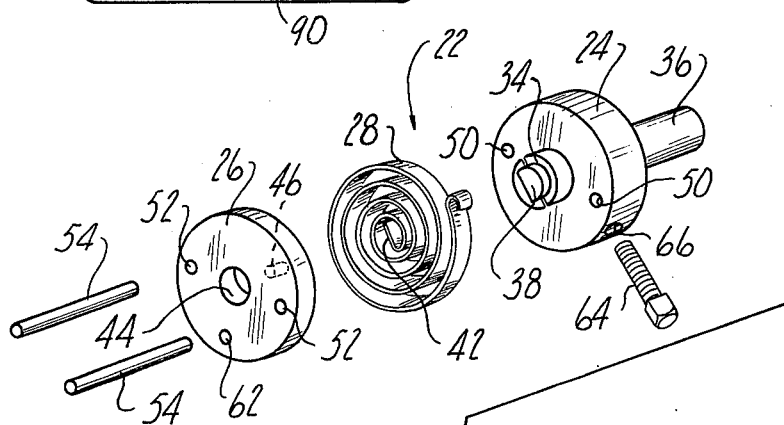
FIG. 4 is an exploded perspective view showing the improved biasing means of the present invention.

A pair of bores 50 are formed near the periphery through the enlarged diameter portion 32 of the spring carrier 24 and parallel to the longitudinal axis of the spring carrier 24. Apertures 52 are similarly formed through the retainer shell 26 and register with the apertures 50 so that removable locking pins 54 may be inserted through the bores 50 and 52 to lock the spring carrier 24 against rotation relative to the retainer shell 26. With the end 42 of the coil spring 28 secured to the spring carrier 24 and the other end 48 of the spring 28 secured to the spring retainer 26, as described above, and with the spring carrier reduced diameter portion 38 positioned in the bore 44 of the retainer shell 26 as shown in FIG. 3, the retainer shell 26 may be rotated relative to the carrier 24 thus increasing the tension of the coil spring 28 until the proper tension of the spring 28 is obtained. The locking pins 54 are then inserted through registering apertures 50 and 52 thereby securing the spring carrier 24 against rotation relative to the retainer shell 26. Simultaneously the coil spring 28 is sandwiched between facing annular surfaces 55 and 56 on the carrier 24 and retainer shell 26, respectively.

With the spring assembly 22 assembled as described above with the desired amount of tension of the coil spring 28, and referring now to FIG. 1, the spring assembly 22 is positioned on the flow meter shaft 18 so that the shaft is received through registering apertures 44 and 30 (FIG. 3). A pin 60 carried by the flow meter housing is received in an aperture 62 in the retainer shell 26 to lock the retainer shell against rotation relative to the flow meter housing in the obvious manner. A bolt 64 is threadably engaged in a transverse bore 66 in the carrier enlarged diameter portion 32 and is tightened against the flow meter shaft 18 to secure the spring carrier 24 against rotation relative to the flow meter shaft 18. After the bolt 64 is tightened, the locking pins 54 are removed from the apertures 50 and 52 so that the spring carrier 24 may rotate relative to the retainer shell 26. A pointer needle 68 is secured by a screw 70 to the open end of the spring carrier reduced diameter portion 36 to provide a visual indication of an indicia plate 72 of the rotational position of the spring carrier 24 and hence the shaft 18.

It can thus be seen that the spring assembly 22 of the present invention provides substantial advantages over the previously known biasing means for flow meter indicators. Most notably, the entire spring assembly 22 may be preassembled at a factory so that the coil spring tension is virtually identical for each spring assembly 22. Replacement of the spring assembly 22 in the field is much simpler than has been previously known since the entire assembly 22 may be simply slipped over the flow meter shaft 18 and the bolt 64 tightened onto the shaft 18. Moreover, by constructing the spring carrier 24 and the retainer shell 26 of a plastic material, metal to metal contact of the coil spring is totally eliminated thus eliminating corrosion and resultant failure of the coil spring 28.

Other improvements to the present invention will become readily apparent to those skilled in the art to which it pertains. For example, as can best be seen in FIG. 1, a cam member 76 having a central bore 78 of substantially the same diameter as the spring carrier reduced diameter portion 36 may be positioned around the portion 36. Any means may be provided to secure the cam member 76 against rotation to the spring carrier 24; for example, a locking bolt 82 may threadably engage a transverse bore 84 in the cam member 76 to abut against the spring carrier reduced portion 36.

Figure 2:
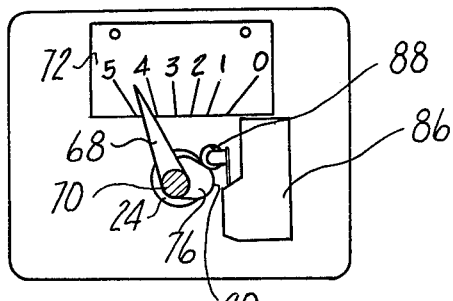
FIG. 2 is a plan view taken substantially along line 2—2 in FIG. 1.

As best shown in FIG. 2, a switch 86 is provided in the indicator housing 11 having a switch actuator 88 adapted to cooperate with the cam surface 90 of the cam member 76. Thus when the cam member 76 reaches a predetermined rotational position, as determined by the rotated position of the flow meter shaft 18, the cam member 76 actuates the switch 86. The switch actuation may be utilized for a variety of purposes. For example, actuation of the switch 86 may sound an alarm or activate a mechanism to clean or change a filter. Other uses of the switch actuation are of course possible and obvious to those skilled in the art.

Having thus described my invention many modifications thereto will become apparent to those skilled in the art to which it pertains without deviation from the spirit of the invention as defined by the scope of the appended claims.

I claim:

1. A fluid flow meter adapted to provide a visual indication of the fluid flow rate through said flow meter, said flow meter being of the type which imparts a rotation to a shaft in response to a variation in the flow rate through said flow meter, and biasing means for biasing said shaft in a rotational direction opposite to that produced by fluid flow through the flow meter, said biasing means further comprising a spring carrier, means for securing said spring carrier to said shaft, a coil spring secured at one end to said spring carrier and at its other end to a spring retainer shell, means for securing said retainer shell against rotation to said flow meter, removable locking means to secure said spring carrier against rotation to said retainer shell, and indicator means operatively secured to said spring carrier and adapted to provide a visual indication of the rotational position of said spring carrier, said removable locking means being removable from said spring carrier and said retainer shell after said spring carrier is secured to said shaft.

2. The fluid flow meter as defined in claim 1 wherein said spring carrier includes a cylindrical portion and said retainer shell includes a cylindrical portion, said coil spring being entrapped between said cylindrical portions of said retainer shell and said spring carrier.

3. The fluid flow meter as defined in claim 2 wherein said coil spring is in a state of tension.

4. A fluid flow meter adapted to provide a visual indication of the fluid flow rate through said flow meter, said flow meter being of the type which imparts a rotation to a shaft in response to a variation in the flow rate through said flow meter, and biasing means for biasing said shaft in a rotational direction opposite to that produced by fluid flow through the flow meter, said biasing means further comprising a spring carrier, means for securing said spring carrier to said shaft, a coil spring secured at one end to said spring carrier and at its other end to a spring retainer shell, means for securing said retainer shell against rotation to said flow meter, removable locking means to secure said spring carrier against rotation to said retainer shell, said locking means comprising at least one pin member positioned in registering apertures formed through said spring carrier and said retainer shell, and indicator means operatively secured to said spring carrier and adapted to provide a visual indication of the rotational position of said spring carrier, wherein said removable locking means are removed from an operable position after said spring carrier is secured to said shaft.

5. A fluid flow meter adapted to provide a visual indication of the fluid flow rate through said flow meter, said flow meter being of the type which imparts a rotation to a shaft in response to a variation in the flow rate through said flow meter, and biasing means for biasing said shaft in a rotational direction opposite to that produced by fluid flow through the flow meter, said biasing means further comprising a spring carrier, means for securing said spring carrier to said shaft, a coil spring secured at one end to said spring carrier and at its other end to a spring retainer shell, means for securing said retainer shell against rotation to said flow meter, removable locking means to secure said spring carrier against rotation to said retainer shell, indicator means operatively secured to said spring carrier and adapted to provide a visual indication of the rotational position of said spring carrier, wherein said removable locking means are removed from an operable position after said spring carrier is secured to said shaft, and a cam member carried by said spring carrier and rotatable therewith to engage actuator means.

* * * * *